VERTICAL GYROSCOPE ERECTION CUT-OFF DEVICE

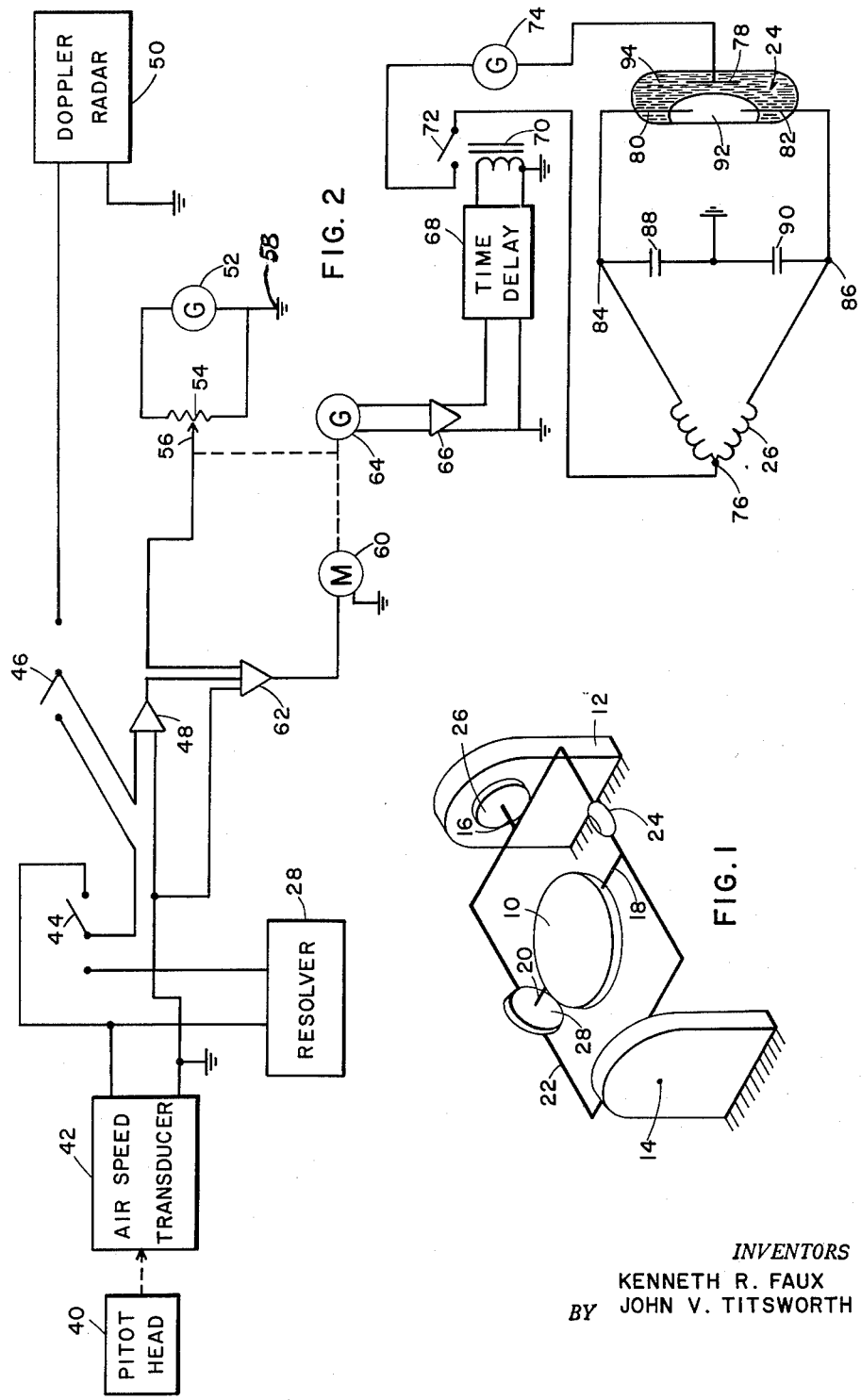

Kenneth R. Faux and John V. Titsworth, Grand Rapids, Mich., assignors, by mesne assignments, to Lear Siegler, Inc., Santa Monica, Calif., a corporation of Delaware
Filed Apr. 15, 1960, Ser. No. 22,564
12 Claims. (Cl. 74—5.41)

This invention pertains to means for disconnecting erecting torques from a vertical gyroscope during acceleration of the supporting vehicle. More particularly, the device of this invention measures the velocity of the supporting vehicle, differentiates it to obtain an acceleration signal, and disconnects the vertical gyroscope from its pitch erecting torquer whenever an acceleration signal occurs.

Prior devices which are utilized to disconnect the erecting voltage do so in response to the electrical output of an accelerometer. Unfortunately, accurate accelerometers are relatively expensive and, further, the accelerometer must be positioned upon a stabilized platform or upon a vertical gyroscope in order to properly orient its sensing mechanism. When devices are connected to a vertical gyroscope, the unbalance of the gyroscope increases the inherent errors of the gyroscope. When an accelerometer is mounted upon a separately stabilized platform, the complexity of the mechanism is increased manifold as is apparent from known stabilized platform devices.

Almost every aircraft has a pitot tube and a means for generating a signal which is proportional to the air referenced velocity, or air speed, of the supporting vehicle. In more modern aircraft, Doppler radars are utilized to measure the ground track velocity of the supporting vehicle.

The device contemplated by this invention preferably utilizes a pitot head and airspeed computer or a Doppler radar to measure the velocity of the supporting vehicle. The voltage proportional to the air speed of the supporting aircraft or to the ground track speed of the supporting vehicle is differentiated to generate an electrical signal which is proportional to the acceleration of the supporting vehicle. The acceleration signal is applied to a time delay means, such as an integrator or filter (for example), to generate a voltage which is adapted to operate a switch to disconnect erecting voltages from the torquers connected to the vertical gyroscope.

It is, therefore, an object of this invention to correct a vertical gyroscope erection system to compensate for acceleration of the supporting vehicle.

It is another object of this invention to disconnect erecting torque from a vertical gyroscope during periods of sustained acceleration.

It is yet another object of this invention to cut off erection torques from a vertical gyroscope in response to a computed acceleration signal.

Other objects will become apparent from the following description when taken in conjunction with the accompanying drawing in which one figure is a block diagram of a typical device of this invention.

In the accompanying drawings, FIGURE 1 is a schematic view of a vertical gyroscope;

FIGURE 2 is a block diagram of the device of this invention which operates to disconnect the pitch erecting torque of the vertical gyroscope shown in FIGURE 1.

A typical vertical gyroscope 10, supported for angular freedom about an axis parallel to the pitch axis of the supporting vehicle 12 and about an axis parallel to the roll axis of the supporting vehicle 12 is shown (by way of example only) in FIGURE 1. In FIGURE 1, vertical gyroscope 10 is supported by shafts 18 and 20 relative to gimbal 22 about an axis which is parallel to the pitch axis of the supporting vehicle 12. Gimbal 22 is supported by shafts 14 and 16 relative to supporting vehicle 12 about an axis parallel to the roll axis of the supporting vehicle.

Although provision is made on the vertical gyroscope 10 and its supporting gimbals to provide for erection torquing about both a pitch and roll axis, only the pitch erection torquer which applies a torque about the roll axis is shown at 26 in FIGURE 1. Further, a pendulum or electrolytic switch sensing element is provided to sense the angle between the spin axis of gyroscope 10 and the local vertical about both the pitch and roll axes of the vertical gyroscope 10. However, in FIGURE 1, only a single electrolytic switch 24 is shown which is positioned to sense the angle between the spin axis of gyroscope 10 and the direction of the local vertical about the pitch axis of gyroscope 10. A resolver 28 is shown in FIGURE 1, adapted to resolve incoming signals to generate an output signal which is equal to the input signal multiplied by the cosine of the pitch angle of the supporting vehicle, measured about shaft 20.

The electrical circuit of the device of this invention is shown more particularly in FIGURE 2. In FIGURE 2, three means of sensing the velocity of the supporting vehicle are shown. In one embodiment of this invention, a pitot head 40 is mechanically connected through conduits, and the like, to an airspeed transducer 42 which is adapted to generate an electrical signal which is proportional to the speed of the supporting vehicle relative to its surrounding air. Pitot head 40 and air speed transducer 42 may be of a variety of forms all of which are known to persons skilled in the art of determining the airspeed of an aircraft.

Switch 44 is a two-position single pole switch which is adapted when in its right position and when switch 46 is in its left position to connect the electrical output of airspeed transducer 42 to the input of isolation amplifier 48.

When switch 46 is connected in its left position and switch 44 is connected in its left position, the electrical output of airspeed transducer 42 is connected through resolver 28, switch 44 and switch 46 to the input of isolation amplifier 48. The amplitude of the voltage applied to the input of amplifier 48 is proportional to the airspeed of the supporting vehicle multiplied by the cosine of the pitch angle of the supporting vehicle to give a ground component of velocity.

In a third embodiment of the device of this invention, switch 46 is positioned to the right to connect Doppler radar 50 to the input of isolation amplifier 48. Doppler radar 50 may be one of a number of Doppler radars which are well known in the art and which are adapted to generate an electrical signal which is proportional to the ground velocity of an aircraft. An example of a typical Doppler radar is shown in "Aviation Age," September 1957 issue, pages 109 et seq.

It is, of course, to be stressed that although the device of this invention is described to correct a vertical gyroscope which is ordinarily used on an aircraft, it is to be expected that as the speed of submarines and other surface vehicles increases that the problem of the effect of acceleration on the pendulum of vertical gyroscopes which are supported by such vehicles will become acute. It is, therefore, submitted that the device of this invention may be also utilized on other vehicles where other means (for example a marine log) may be utilized to determine the velocity of the supporting vehicle.

Alternator 52 is connected across potentiometer 54 whose movable arms 56 generates a voltage relative to ground terminal 58 which is proportional to the position of arm 56. Arm 56 is mechanically connected to be driven by motor 60 in accordance with the position of the rotor of motor 60. The electrical output of amplifier 48 is mixed in amplifier 62 with the electrical output of potentiometer 56 to generate an error signal which represents the difference in voltage between the voltage at the output of amplifier 48 and the voltage on the arm of potentiometer 56. The error signal which is applied to motor 60, then, positions the shaft of motor 60 in a position which is proportional to the signal input to amplifier 48. When the velocity of the supporting vehicle changes, the shaft of motor 60 assumes a new position. Generator 64 is driven by motor 60 to generate an electrical signal which is proportional to the acceleration of the supporting vehicle. The electrical output of generator 64 is connected through an isolation amplifier 66 and a time delay means 68 to solenoid 70. Time delay means 68 may be, for example, a filter or integrating network which prevents spikes of acceleration voltage, which have short time duration, from actuating solenoid 70. Solenoid 70 is connected to open switch 72 when solenoid 70 is energized.

Alternator 74 is connected through switch 72 to the center tap 76 of torquing device 26 which (as shown in FIGURE 1) is positioned on shaft 16 to generate a torque between shaft 16 and supporting vehicle 12 in accordance with the current flow through torquer 26. Alternator 74 is connected to electrode 78 of a pendulum means such as electrolytic switch 24. Electrodes 80 and 82 of electrolytic switch 24 are connected to the opposite terminals 84 and 86 of torquer 26. Condensers 88 and 90 are series-connected between terminals 84 and 86 with their common terminal grounded. Electrolytic switch 24, torquer 26, alternator 74 and condensers 88 and 90 form a bridge circuit which is adapted to generate an unbalanced current flow in torquer 26 in response to the position of bubble 92. It is to be stressed that alternative electrical circuits can be utilized either with an electrolytic switch or other pendulum means to sense the angle between the spin axis of gyroscope 10 and the direction of the local vertical and to provide torque about the roll axis of the vertical gyroscope 10.

In operation, when bubble 92 of electrolytic switch 24 is displaced by pendulum action to one side or the other of the center of electrolytic switch 24, the bridge of the electrolytic fluid 94 and torquer 26 is unbalanced to cause a current to flow through one winding or the other of torquer 26. When current flows through one winding or the other of torquer 26, a torque is generated between supporting vehicle 12 and shaft 16 to apply a torque to vertical gyroscope 10 about its roll axis which causes gyroscope 10 to precess about its pitch axis to thereby return bubble 92 to its centered position. Bubble 92 acts as a pendulum and is displaced not only by gravity but also by accelerations of the supporting vehicle.

In the first embodiment of this invention, pitot head 40 senses a variation between ram and static pressure of the air surrounding supporting vehicle 12 to cause airspeed transducer 42 to generate an electrical signal which is proportional to the airspeed of the supporting vehicle. The electrical signal at the output of airspeed transducer 42 is connected through switch 44 and 46 to the input of isolation amplifier 48, thence through amplifier 62 to motor 60 to cause the shaft of motor 60 to take a position which is proportional to the voltage applied to the input of amplifier 48. The shaft position of motor 60 is repeated in the position of arm 56 of potentiometer 54 to generate a voltage to cancel out the voltage which appears at the output of amplifier 48 to thereby cause the voltage at the output of amplifier 62 to be merely an error signal.

In a second embodiment of this invention, when switch 46 is in its left position and switch 44 is in its left position, the voltage output of airspeed transducer 42 is reduced by the cosine of the pitch angle of the supporting vehicle by means of resolver 28, then is channeled through switch 44 and switch 46 to the input of amplifier 48 which then drives motor 60 to a position which is proportional to the voltage applied to the input of amplifier 48.

In a third embodiment of the device of this invention, when switch 46 is in its right hand position, Doppler radar 50 generates a signal which is proportional to the ground track velocity of the supporting vehicle. The electrical output of Doppler radar 50 is applied to the input of amplifier 48 which then drives the output shaft of motor 60 to a position proportional to the signal at the input of amplifier 48.

Generator 64 is a derivative device. That is, since the position of the shaft of generator 64 is proportional to the velocity of the supporting vehicle, when the shaft of generator 64 moves a voltage is generated which is a measure of the acceleration of the supporting vehicle. The electrical acceleration signal at the output of generator 64 is channeled through amplifier 66 and time delay means 68 to control solenoid 70. It is desirable that the solenoid 70 is not operated when accelerations are measured which have a short time duration but only when the acceleration is a sustained one. The amount of time delay which occurs in time delay means 68 is an adjustable one which depends upon the supporting vehicle 12, vertical gyroscope 10, and their characteristics. When solenoid 70 is operated, switch 72 opens to disconnect the exciting voltage of voltage source 74 from the bridge network (which includes torquer 26) to thereby eliminate the application of torque by torquer 26 about shaft 16. It is to be stressed that the position in the circuit of switch 72 is not critical and need not be in the voltage source line but may be at any other position in the circuit where actuation of the switch removes torquing current from torquing means 26.

Thus, the device of this invention is utilized to compensate for errors which appear in the erection torques of vertical gyroscopes when the supporting vehicle is accelerated. Further, the device of this invention is extremely economical compared to other known devices.

Although the device of this invention has been described in detail above, it is not intended that it should be limited by the above description, but only in accordance with the spirit and scope of the following claims.

We claim:

1. In combination: a vertical gyroscope, gimballed relative to a supporting vehicle; means for applying pitch erection torque to said gyroscope; means for detecting the angle, about the pitch axis of said vehicle, between the spin axis of said gyroscope and the direction of the local vertical, connected to control said torquing means; means for sensing the velocity of said supporting vehicle; means for differentiating the velocity output of said velocity sensing means to obtain a signal proportional to the acceleration of said supporting vehicle; and switch means connected to be responsive to said differentiating means and connected to remove said pitch erecting torque when said supporting vehicle is accelerated.

2. In combination: a vertical gyroscope, gimballed relative to a supporting vehicle; means for applying pitch erection torque to said gyroscope; means for detecting the angle, about the pitch axis of said vehicle, between the spin axis of said gyroscope and the direction of the local vertical, connected to control said torquing means; means for sensing the velocity of said supporting vehicles; means for differentiating the velocity output of said velocity—sensing means to obtain a signal proportional to the acceleration of said supporting vehicle; switch means connected to be responsive to said differentiating means and connected to remove said pitch erecting torque when said supporting vehicle is accelerated; and time delay means connected between said switch means and said differentiating means to prevent said switch from being opened by momentary accelerations of said supporting vehicle.

3. A device as recited in claim 1 wherein said velocity sensing means is a pitot head and an airspeed transducer.

4. A device as recited in claim 2 wherein said velocity sensing means is a pitot head and an airspeed transducer.

5. A device as recited in claim 3 and further comprising means for correcting for the pitch angle of said supporting vehicle.

6. A device as recited in claim 4 and further comprising means for correcting for the pitch angle of said supporting vehicle.

7. A device as recited in claim 1 wherein said velocity sensing means is a Doppler radar.

8. A device as recited in claim 2 wherein said velocity sensing means is a Doppler radar.

9. A device as recited in claim 1 wherein said means for detecting the angle, about the pitch axis of said vehicle, between the spin axis of said gyroscope and the direction of the local vertical is an electrolytic switch.

10. A device as recited in claim 1 wherein said means for detecting the angle, about the pitch axis of said vehicle, between the spin axis of said gyroscope and the local vertical is pendulum means.

11. A device as recited in claim 2 wherein said means for detecting the angle, about the pitch axis of said vehicle, between the spin axis of said gyroscope and the local vertical is pendulum means.

12. A device as recited in claim 11 wherein said pendulum means is an electrolytic switch.

References Cited in the file of this patent

UNITED STATES PATENTS

| | | |
|---|---|---|
| 2,419,063 | Fischer | Apr. 15, 1947 |
| 2,450,320 | Wendt | Sept. 28, 1948 |
| 2,497,614 | Libman | Feb. 14, 1950 |
| 2,620,669 | Braddon | Dec. 9, 1952 |